(12) United States Patent
Boughton et al.

(10) Patent No.: US 10,167,220 B2
(45) Date of Patent: Jan. 1, 2019

(54) METHOD AND APPARATUS FOR ADDING THERMAL ENERGY TO A GLASS MELT

(71) Applicant: CORNING INCORPORATED, Corning, NY (US)

(72) Inventors: Daniel Robert Boughton, Naples, NY (US); Scott Michael Jarvis, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/425,517

(22) Filed: Feb. 6, 2017

(65) Prior Publication Data

US 2017/0217811 A1 Aug. 3, 2017

Related U.S. Application Data

(62) Division of application No. 14/592,452, filed on Jan. 8, 2015.

(51) Int. Cl.
*C03B 5/02* (2006.01)
*C03B 5/225* (2006.01)
(Continued)

(52) U.S. Cl.
CPC .............. *C03B 5/025* (2013.01); *C03B 5/185* (2013.01); *C03B 5/193* (2013.01); *C03B 5/225* (2013.01);
(Continued)

(58) Field of Classification Search
CPC .. H05H 1/26; H05H 1/28; H05H 1/30; H05H 1/46; H05H 1/50; H05H 1/2406;
(Continued)

(56) References Cited

U.S. PATENT DOCUMENTS 1,476,432 A * 12/1923 Troutman ................. C03B 5/06
432/137
3,937,625 A 2/1976 Stewart
(Continued)

FOREIGN PATENT DOCUMENTS

CN 1248248 C 3/2006
CN 101767202 A 7/2010
(Continued)

OTHER PUBLICATIONS

Ahmadpour et al; "The Preparation of Active Carbons From Coal by Chemical and Physical Activation"; Carbon, vol. 34, No. 4, pp. 471-479; 1996.
(Continued)

*Primary Examiner* — Jason L Lazorcik

(57) ABSTRACT

Disclosed herein are methods and apparatuses for adding thermal energy to a glass melt. Apparatuses for generating a thermal plasma disclosed herein comprise an electrode, a grounded electrode, a dielectric plasma confinement vessel extending between the two electrodes, and a magnetic field generator extending around the dielectric plasma confinement vessel. Also disclosed herein are methods for fining molten glass comprising generating a thermal plasma using the apparatuses disclosed herein and contacting the molten glass with the thermal plasma. Glass structures produced according to these methods are also disclosed herein.

6 Claims, 3 Drawing Sheets

US 10,167,220 B2

Page 2

(51) Int. Cl.

| | | |
|---|---|---|
| *H05H 1/24* | (2006.01) | |
| *H05H 1/46* | (2006.01) | |
| *C03C 3/06* | (2006.01) | |
| *C03C 3/062* | (2006.01) | |
| *C03C 3/064* | (2006.01) | |
| *C03C 3/078* | (2006.01) | |
| *C03C 3/083* | (2006.01) | |
| *C03C 3/085* | (2006.01) | |
| *C03C 3/087* | (2006.01) | |
| *C03C 3/089* | (2006.01) | |
| *C03C 3/091* | (2006.01) | |
| *C03C 3/12* | (2006.01) | |
| *C03C 3/145* | (2006.01) | |
| *H05B 7/08* | (2006.01) | |
| *H05B 7/12* | (2006.01) | |
| *H05B 7/22* | (2006.01) | |
| *H05H 1/28* | (2006.01) | |
| *H05H 1/30* | (2006.01) | |
| *H05H 1/34* | (2006.01) | |
| *H05H 1/50* | (2006.01) | |
| *C03B 5/185* | (2006.01) | |
| *C03B 5/193* | (2006.01) | |

(52) U.S. Cl.
CPC .............. *C03C 3/06* (2013.01); *C03C 3/062* (2013.01); *C03C 3/064* (2013.01); *C03C 3/078* (2013.01); *C03C 3/083* (2013.01); *C03C 3/085* (2013.01); *C03C 3/087* (2013.01); *C03C 3/089* (2013.01); *C03C 3/091* (2013.01); *C03C 3/125* (2013.01); *C03C 3/145* (2013.01); *H05B 7/08* (2013.01); *H05B 7/12* (2013.01); *H05B 7/22* (2013.01); *H05H 1/2406* (2013.01); *H05H 1/28* (2013.01); *H05H 1/30* (2013.01); *H05H 1/34* (2013.01); *H05H 1/46* (2013.01); *H05H 1/50* (2013.01); *H05H 2001/2456* (2013.01); *H05H 2001/2462* (2013.01); *H05H 2001/4645* (2013.01); *H05H 2001/4692* (2013.01); *Y02P 40/57* (2015.11)

(58) Field of Classification Search
CPC .... H05H 2001/4645; H05B 7/08; H05B 7/12; H05B 7/22; C03B 5/06; C03B 5/08; C03B 5/025; C03B 5/00–5/44; C03B 2211/25; C03B 2211/00–2211/71; C03B 5/185; C03B 5/193; C03B 5/225
See application file for complete search history.

(56) References Cited

U.S. PATENT DOCUMENTS

| | | | |
|---|---|---|---|
| 4,082,694 A | | 4/1978 | Wennerberg et al. |
| 4,318,712 A | | 3/1982 | Lang et al. |
| 5,081,397 A | | 1/1992 | Liang et al. |
| 5,147,448 A | | 9/1992 | Roberts et al. |
| 5,198,724 A | | 3/1993 | Koinuma et al. |
| 5,238,888 A | | 8/1993 | Abe |
| 5,403,453 A | | 4/1995 | Roth et al. |
| 5,414,324 A | | 5/1995 | Roth et al. |
| 5,421,891 A | * | 6/1995 | Campbell ............. C23C 16/513 118/723 AN |
| 5,456,972 A | | 10/1995 | Roth et al. |
| 5,490,869 A | * | 2/1996 | D'Obrenan ............. B09B 3/005 75/10.14 |
| 5,527,518 A | | 6/1996 | Lynum et al. |
| 5,571,301 A | * | 11/1996 | Yamaura ............... C03B 3/02 588/256 |
| 5,669,583 A | | 9/1997 | Roth |
| 5,711,664 A | | 1/1998 | Jegou et al. |
| 5,734,143 A | * | 3/1998 | Kawase ............ H01J 37/32229 204/298.38 |
| 5,750,822 A | | 5/1998 | Gotovchikov et al. |
| 5,938,854 A | | 8/1999 | Roth |
| 6,042,370 A | | 3/2000 | Weide |
| 6,053,013 A | | 4/2000 | Oh et al. |
| 6,348,126 B1 | | 2/2002 | Hanawa et al. |
| 6,351,075 B1 | | 2/2002 | Barankova et al. |
| 6,410,449 B1 | | 6/2002 | Hanawa et al. |
| 6,417,625 B1 | * | 7/2002 | Brooks ............ H01J 37/32009 315/111.31 |
| 6,428,600 B1 | | 8/2002 | Flurschutz et al. |
| 6,453,842 B1 | | 9/2002 | Hanawa et al. |
| 6,468,388 B1 | | 10/2002 | Hanawa et al. |
| 6,494,986 B1 | | 12/2002 | Hanawa et al. |
| 6,551,446 B1 | | 4/2003 | Hanawa et al. |
| 6,893,907 B2 | | 5/2005 | Maydan et al. |
| 6,919,527 B2 | | 7/2005 | Boulos et al. |
| 6,939,434 B2 | | 9/2005 | Collins et al. |
| 7,037,813 B2 | | 5/2006 | Collins et al. |
| 7,094,316 B1 | | 8/2006 | Hanawa et al. |
| 7,094,670 B2 | | 8/2006 | Collins et al. |
| 7,137,354 B2 | | 11/2006 | Collins et al. |
| 7,166,524 B2 | | 1/2007 | Al-Bayati et al. |
| 7,183,177 B2 | | 2/2007 | Al-Bayati et al. |
| 7,223,676 B2 | | 5/2007 | Hanawa et al. |
| 7,264,688 B1 | | 9/2007 | Paterson et al. |
| 7,288,491 B2 | | 10/2007 | Collins et al. |
| 7,291,545 B2 | | 11/2007 | Collins et al. |
| 7,294,563 B2 | | 11/2007 | Al-Bayati et al. |
| 7,303,982 B2 | | 12/2007 | Collins et al. |
| 7,320,734 B2 | | 1/2008 | Collins et al. |
| 7,393,765 B2 | | 7/2008 | Hanawa et al. |
| 7,430,984 B2 | | 10/2008 | Hanawa et al. |
| 7,465,478 B2 | | 12/2008 | Collins et al. |
| 7,479,456 B2 | | 1/2009 | Buchberger, Jr. et al. |
| 7,622,693 B2 | | 11/2009 | Foret |
| 7,642,180 B2 | | 1/2010 | Al-Bayati et al. |
| 7,665,407 B2 | | 2/2010 | Hwang et al. |
| 7,700,465 B2 | | 4/2010 | Collins et al. |
| 7,709,415 B2 | | 5/2010 | Sugo et al. |
| 7,719,200 B2 | | 5/2010 | Laroussi |
| 7,743,730 B2 | | 6/2010 | Kholodenko et al. |
| 7,867,366 B1 | | 1/2011 | McFarland et al. |
| 7,951,749 B2 | | 5/2011 | Yang et al. |
| 8,002,992 B2 | | 8/2011 | Foret |
| 8,076,258 B1 | | 12/2011 | Biberger |
| 8,232,729 B2 | | 7/2012 | Kitano et al. |
| 8,263,178 B2 | | 9/2012 | Boulos et al. |
| 8,318,356 B2 | | 11/2012 | Gadkaree et al. |
| 8,324,523 B2 | | 12/2012 | Foret |
| 8,357,873 B2 | | 1/2013 | Foret |
| 8,361,404 B2 | | 1/2013 | Gutsol et al. |
| 8,366,925 B2 | | 2/2013 | Foret |
| 8,773,138 B2 | | 7/2014 | Shinada et al. |
| 8,784,764 B2 | | 7/2014 | Gadkaree et al. |
| 8,797,041 B2 | | 8/2014 | Shinada et al. |
| 8,829,913 B2 | | 9/2014 | Shinada et al. |
| 8,883,110 B2 | | 11/2014 | Ueda |
| 9,284,210 B2 | | 3/2016 | Boughton |
| 9,802,850 B2 | * | 10/2017 | Ohmstede ............... C03B 5/185 |
| 2003/0027054 A1 | | 2/2003 | Ball et al. |
| 2003/0047449 A1 | | 3/2003 | Hanawa et al. |
| 2003/0226641 A1 | | 12/2003 | Collins et al. |
| 2004/0012319 A1 | | 1/2004 | Shun'ko |
| 2004/0050098 A1 | | 3/2004 | Ball et al. |
| 2004/0107906 A1 | | 6/2004 | Collins et al. |
| 2004/0107907 A1 | | 6/2004 | Collins et al. |
| 2004/0107908 A1 | | 6/2004 | Collins et al. |
| 2004/0107909 A1 | | 6/2004 | Collins et al. |
| 2004/0112542 A1 | | 6/2004 | Collins et al. |
| 2004/0149217 A1 | | 8/2004 | Collins et al. |
| 2004/0149218 A1 | | 8/2004 | Collins et al. |
| 2004/0166612 A1 | | 8/2004 | Maydan et al. |
| 2004/0200417 A1 | | 10/2004 | Hanawa et al. |
| 2004/0238345 A1 | | 12/2004 | Koulik et al. |
| 2005/0016456 A1 | | 1/2005 | Taguchi et al. |
| 2005/0051271 A1 | | 3/2005 | Collins et al. |
| 2005/0051272 A1 | | 3/2005 | Collins et al. |

(56) References Cited

U.S. PATENT DOCUMENTS

| | | |
|---|---|---|
| 2005/0070073 A1 | 3/2005 | Al-Bayati et al. |
| 2005/0136604 A1 | 6/2005 | Al-Bayati et al. |
| 2005/0191827 A1 | 9/2005 | Collins et al. |
| 2005/0191828 A1 | 9/2005 | Al-Bayati et al. |
| 2005/0191830 A1 | 9/2005 | Collins et al. |
| 2005/0230047 A1 | 10/2005 | Collins et al. |
| 2006/0043065 A1 | 3/2006 | Buchberger, Jr. et al. |
| 2006/0073683 A1 | 4/2006 | Collins et al. |
| 2006/0081558 A1 | 4/2006 | Collins et al. |
| 2006/0144089 A1* | 7/2006 | Eichholz .................. C03B 5/027 65/29.21 |
| 2007/0042580 A1 | 2/2007 | Al-Bayati et al. |
| 2007/0075051 A1* | 4/2007 | Morrisroe ................ H05H 1/30 219/121.52 |
| 2007/0119546 A1 | 5/2007 | Collins et al. |
| 2007/0137573 A1 | 6/2007 | Kholodenko et al. |
| 2007/0175241 A1 | 8/2007 | Delamielleure et al. |
| 2007/0212811 A1 | 9/2007 | Hanawa et al. |
| 2007/0235419 A1* | 10/2007 | Kong ........................ H05H 1/30 219/121.36 |
| 2008/0044960 A1 | 2/2008 | Al-Bayati et al. |
| 2008/0145553 A1* | 6/2008 | Boulos ................... B01J 19/088 427/447 |
| 2008/0173641 A1 | 7/2008 | Hadidi et al. |
| 2009/0064716 A1 | 3/2009 | Sakamoto et al. |
| 2009/0149028 A1 | 6/2009 | Marakhtanov et al. |
| 2009/0188898 A1* | 7/2009 | Kong ........................ H05H 1/50 219/121.52 |
| 2009/0193850 A1* | 8/2009 | Sakai ........................ C03B 5/26 65/66 |
| 2010/0044477 A1 | 2/2010 | Foret |
| 2010/0074807 A1* | 3/2010 | Bulkin ................ H01J 37/32192 422/186.03 |
| 2010/0199721 A1 | 8/2010 | Antoine et al. |
| 2010/0218558 A1* | 9/2010 | Gross ........................ C03B 5/03 65/135.6 |
| 2011/0097901 A1 | 4/2011 | Banna et al. |
| 2011/0133746 A1 | 6/2011 | Shinada et al. |
| 2011/0140607 A1* | 6/2011 | Moore .................. A61B 18/042 315/111.21 |
| 2011/0187379 A1 | 8/2011 | Shinada et al. |
| 2011/0201492 A1 | 8/2011 | Yang et al. |
| 2011/0260732 A1 | 10/2011 | Shinada et al. |
| 2011/0298376 A1* | 12/2011 | Kanegae ................ B01J 19/088 315/111.51 |
| 2011/0300029 A1 | 12/2011 | Foret |
| 2011/0316551 A1 | 12/2011 | Shinada et al. |
| 2011/0316552 A1 | 12/2011 | Shinada et al. |
| 2012/0125052 A1 | 5/2012 | Dong et al. |
| 2012/0137736 A1* | 6/2012 | Sakamoto ................ C03B 3/00 65/66 |
| 2012/0137737 A1* | 6/2012 | Sakamoto .............. C03B 3/026 65/66 |
| 2012/0159992 A1* | 6/2012 | Sakamoto ................ C03B 3/00 65/66 |
| 2012/0159994 A1* | 6/2012 | Sakamoto .............. C03B 3/026 65/136.3 |
| 2012/0167631 A1* | 7/2012 | Sakamoto .............. C03B 3/026 65/66 |
| 2012/0187844 A1 | 7/2012 | Hoffman et al. |
| 2012/0216571 A1* | 8/2012 | Sakamoto .............. C03B 3/026 65/66 |
| 2012/0321527 A1 | 12/2012 | Gutsol et al. |
| 2012/0321895 A1 | 12/2012 | Ueda |
| 2013/0118589 A1 | 5/2013 | Hu et al. |
| 2013/0126332 A1 | 5/2013 | Foret |
| 2013/0126485 A1 | 5/2013 | Foret |
| 2013/0175405 A1 | 7/2013 | Khozikov et al. |
| 2014/0000316 A1 | 1/2014 | Coggin, Jr. |
| 2014/0291302 A1* | 10/2014 | Morrisroe ................ H05H 1/30 219/121.48 |
| 2014/0332506 A1* | 11/2014 | Morrisroe ................ H05H 1/46 219/121.52 |
| 2015/0274566 A1 | 10/2015 | Boughton |
| 2015/0274567 A1* | 10/2015 | Boughton ............ H05H 1/2406 65/135.6 |
| 2016/0029472 A1* | 1/2016 | Jevtic ........................ H05H 1/46 250/288 |

FOREIGN PATENT DOCUMENTS

| | | |
|---|---|---|
| CN | 102522310 A | 6/2012 |
| CN | 202310265 U | 7/2012 |
| EP | 2242336 A1 | 10/2010 |
| EP | 2256781 A1 | 12/2010 |
| EP | 1831425 B1 | 7/2011 |
| EP | 2424336 A1 | 2/2012 |
| FR | 2629573 A1 | 10/1989 |
| GB | 2196956 A | 5/1988 |
| IN | 200900450 P2 | 8/2009 |
| JP | 03064182 | 5/2000 |
| JP | 2002191972 A | 7/2002 |
| JP | 2003212572 A | 7/2003 |
| JP | 2004124231 A | 4/2004 |
| JP | 2004225135 A | 8/2004 |
| JP | 2004338991 A | 12/2004 |
| JP | 06369279 B2 | 4/2005 |
| JP | 2006244938 A | 9/2006 |
| JP | 2008202804 A | 9/2008 |
| JP | 04239145 B2 | 3/2009 |
| JP | 2013082591 A | 5/2013 |
| JP | 2013112540 A | 6/2013 |
| JP | 2013112571 A | 6/2016 |
| KR | 2003008166 A | 1/2003 |
| WO | 2001039560 A1 | 5/2001 |
| WO | 2006078340 A2 | 7/2006 |
| WO | 2009043001 A1 | 4/2009 |
| WO | 2012026819 A1 | 3/2012 |
| WO | 2012043484 A1 | 4/2012 |
| WO | 2012103101 A1 | 8/2012 |
| WO | 201513173 A1 | 1/2015 |
| WO | 201550803 A1 | 4/2015 |

OTHER PUBLICATIONS

Ahmadpour et al; "The Preparation of Activated Carbon From Macadamia Nutshell by Chemical Activation" Carbon, vol. 35, No. 12, pp. 1723-1732 1997.

Al-Shamma et al., "Design and Construction of a 2.45 GHz Waveguide-Based Microwave Plasma Jet at Atmospheric Pressure for Material Processing", Journal of Physics D: Applied Physics, 2001, vol. 34, pp. 2734-2741.

Boulos, "Plasma Power Can Make Better Powders", Metal Powder Report, May 2014, pp. 16-21.

Cadek et al; "Bio-Based Materials for Supercapacitor"; SGL Group—The Carbon Company, Meitingen Germany; 3 Pages.

Gupta et al; "Fluid Bed Technology in Materials Processing" Chapter 4.

Huang et al; "Low-Temperature Cyclonic Plasma Created at Atmospheric Pressure," Plasma Science, IEEE Transactions, vol. 37, No. 7, pp. 1169,1171, Jul. 2009.

Huang et al; "Contact Angle Analysis of Low-Temperature Cyclonic Atmospheric Pressure Plasma Modified Polyethylene Terephthalate," Thin Solid Films, vol. 518, Issue 13, pp. 3575-3580, 2010.

Illan-Gomez et al; "Acitvated Carbons From Spanish Coals. 2. Chemical Activation"; Energy and Fuels, 1996, 10, 1108-1114.

International Search Report and Written Opinion PCT/US2015/022982 dated Jun. 24, 2015.

International Search Report and Written Opinion PCT/US2016/012557 dated Apr. 22, 2016.

Kadlec et al; "Structure of Pores of Active Carbons Prepared by Water-Vapour and Zinc-Dichloride Activation"; Carbon, 1970, vol. 8, pp. 321-331.

Kawaguchi et al; "Challenge to Improve Glass Melting and Fining Process"; Ceramics—Silikaty 52 (4) 217-224 (2008).

Kment et al; "Atmospheric Pressure Barrier Torch Discharge and Its Optimization for Flexible Deposition of TiO2 Thin Coatings on Various Surfaces," Surface and Coatings Technology, vol. 204, 2009, pp. 667-675.

(56) References Cited

OTHER PUBLICATIONS

Kurniawan et al., "Plasma Polymerization of Basalt Fiber/Polylactic Acid Composites: Effects on Mechanical Properties", 18th International Conference on Composite Materials, pp. 1-4.

Kurniawan et al.; "Atmospheric Pressure Glow Discharge Plasma Polymerization for Surface Treatment on Sized Basalt Fiber/Polylactic Acid Composites"; Composites: Part B 43 (2012) 1010-1014.

Laimer et al., "Characterization of an Atmospheric Pressure Radio-Frequency Capacitive Plasma Jet", Plasma Processes and Polymers, 2007, vol. 4, pp. S487-S492.

Laimer et al., "Investigation of an Atmospheric Pressure Radio-Frequency Capacitive Plasma Jet", Vacuum Surface Engineering Surface Instrumentation & Vacuum Technology, 2005, vol. 79, pp. 209-214.

Lie, et al., "Characteristics of Gliding Arc Discharge Plasma", Plasma Science & Technology, Nov. 2006, vol. 8, No. 6, pp. 653-655.

Lu et al; "On Atmospheric-Pressure Non-Equilibrium Plasma Jets and Plasma Bullets," Plasma Sources Science and Technology, vol. 21, No. 034005, 2012, pp. 1-17.

Nemec et al; "Glass Melting and Its Innovation Potentials: Bubble Removal Under the Effect of the Centrifugal Force"; Ceramics—Silikaty 52 (4) 225-239 (2008).

Pandolfo et al; "Carbon Properties and Their Role in Supercapacitors"; Journal of Power Sources 157 (2006) 11-27.

Park et al., "Discharge Phenomena of an Atmospheric Pressure Radio-Frequency Capacitice Plasma Source", Journal of Applied Physics, Jan. 1, 2001, vol. 89, No. 1, pp. 20-28.

Park et al., "Gas Breakdown in an Atmospheric Pressure Radio-Frequency Capacitive Plasma Source", Journal of Applied Physics, Jan. 1, 2001, vol. 89, No. 1, pp. 15-19.

Reece "Industrial Plasma Engineering: vol. 1: Principles," Philadelphia: Institute of Physics Publishing, 2003, pp. 167-170.

Roth "Industrial Plasma Engineering: vol. 1: Principles," Philadelphia: Institute of Physics Publishing, 2003, pp. 167-170.

Roth, "Atmospheric Dielectric Barrier Discharges (DBDS)", Industrial Plasma Engineering, vol. 2, Copyright IOP Publishing Ltd 2001, Applications to Nonthermal Plasma Processing, pp. 50-65.

Roth, "Capacitive RF Electrical Discharges in Gases", Industrial Plasma Engineering, vol. 1, Copyright IOP Publishing Ltd 1995, Principles, pp. 440-461.

Roth, et al., "The Physics and Phenomenology of One Atmosphere Uniform Glow Discharge Plasma (OAUGDPTM) Reactors for Surface Treatment Applications", Journal of Physics D: Applied Physics, 2005, vol. 38, pp. 555-567.

Sands et al;"A Streamer-Like Atmospheric Pressure Plasma Jet," Applied Physics Letters, vol. 92, Apr. 2008, pp. 151503-1-151503-3.

Seo, et al,; "Radio Frequency Thermal Plasma Treatment for Size Reduction and Spheroidization of Glass Powders Used in Ceramic Electronic Devices"; J. Am. Ceram. Soc., 90 (6) 1717-1722 (2007).

Seo, et al., "Direct Synthesis of Nano-Sized Glass Powders With Spherical Shape by RF (Radio Frequency) Thermal Plasma", Thin Solid Films, 2011, vol. 519, pp. 7111-7115.

Teng et al; "Preparation of Porous Carbons From Phenol-Formaldehyde Resins With Chemical and Physical Activation"; Carbon 38 (2000) 817-824.

Tennison et al; "Phenolic-Resin-Derived Activated Carbons"; Applied Catalysis A: General 173 (1998) 289-311.

Truesch et al; "Basic Properties of Specific Wood-Based Materials Carbonised in a Nitrogen Atmosphere"; Wood Sci Technol (2004) 38, 323-333.

Wylie, et al., "An Atmospheric Microwave Plasma Jet for Ceramic Material Processing", Journal of Materials Processing Technology, 2004, vols. 153-154, pp. 288-293.

Yan et al; "Spheroidization of Silica Powders in a Radio Frequency Plasma"; Institute of Process Engineering, Chinese Acaday of Sciences; 5 Pages.

Yao, et al., "An Innovative Energy-Saving In-Flight Melting Technology and Its Application to Glass Production", Science and Technology of Advanced Materials, 2008, vol. 9, pp. 1-8.

Yue et al; "Preparation of Fibrous Porous Materials by Chemical Activation 1. ZnCl2 Activation of Polymer-Coated Fibers"; Carbon 40 (2002) 1181-1191.

Yue et al; "Preparation of Fibrous Porous Materials by Chemical Activation 2. H3PO4 Activation of Polymer Coated Fibers"; Carbon 41 (2003) 1809-1817.

Conrads, H. and Schmidt, M. (2000). Plasma Generation and Plasma Sources. Plasma Sources Science and Technology, (4), pp. 441-454.

* cited by examiner

METHOD AND APPARATUS FOR ADDING THERMAL ENERGY TO A GLASS MELT

CROSS-REFERENCE TO RELATED APPLICATIONS

This application is a Divisional of and claims the benefit of priority to U.S. application Ser. No. 14/592,452, filed on Jan. 8, 2015, the content of which is relied upon and incorporated herein by reference in its entirety.

FIELD OF THE DISCLOSURE

The present disclosure relates generally to methods and apparatuses for processing glass batch materials, and more particularly to methods and apparatuses for adding thermal energy to a glass melt using RF plasma during a fining process.

BACKGROUND

Glass substrates may be used in a variety of applications, ranging from windows to high-performance display devices. The quality requirements for glass substrates have become more stringent as the demand for improved resolution, clarity, and performance increases. Glass quality may, however, be negatively impacted by various processing steps, from forming the glass melt to final packaging of the glass product. In particular, glass sheets may be rendered unsuitable for use by the presence of bubbles and, in some cases, even a single bubble in the glass sheet.

During the melting process, glass precursor batch materials are mixed together and heated in a melter. The batch materials melt and react, giving off reaction gases, which produce bubbles in the molten glass. The molten glass then undergoes a fining step to remove gas bubbles trapped in the melt. However, such fining steps often require long processing times, high energy expenditure, and/or increased expense, as the reaction gases have a long distance to travel to escape the glass melt. To promote the escape of bubbles from the glass melt, fining is often carried out using long tubes (e.g., several meters long) constructed from materials such as platinum, which can have a considerably large footprint and expense.

In addition to consuming space, energy, and/or capital, current fining processes can also limit the glass compositions that can be effectively melted and fined. For example, to drive the escape of bubbles from the glass melt, fining temperatures at least about 50° C., and sometimes at least about 100° C., in excess of the melting temperature are often used. Thus, upper limits on the attainable fining temperature can impose limitations on glass compositions with higher glass transition temperatures, such as temperatures in excess of about 1600° C. or more.

Fining can promote bubble removal via two processes. Stokes fining occurs when an increase in the glass temperature leads to a lower viscosity of the glass melt. Bubbles can then rise more rapidly through the less viscous glass melt. Chemical fining occurs when an increase in the glass temperature chemically reduces a chemical fining agent such as tin, thus releasing oxygen into the glass, which can then be incorporated into the bubbles. As the bubbles take up excess oxygen they increase in size and rise through the glass melt more easily, sometimes merging with other bubbles and/or collapsing. Fining agents can include tin, arsenic, and antimony, to name a few. Arsenic and antimony are stronger fining agents but may pose safety and environmental hazards and, thus, are less frequently used. Tin oxide is relatively safer, but also has relatively weaker fining power. Moreover, the amount of tin that can be incorporated as a fining agent into the glass batch materials is often limited because elevated levels of tin can lead to the formation of secondary crystals during downstream processing (e.g., on the forming body or isopipe).

Various methods for promoting fining have thus been investigated by Applicant, such as vacuum fining, centrifugal fining, and reabsorption of bubbles via deep melt pools. However, these methods still suffer from one or more drawbacks including high cost and/or reduced effectiveness at higher fining temperatures. Hot spot fining, or the production of local zones of increased temperatures within the flowing glass stream, has also been investigated by Applicant. Hot spot fining can be achieved, for example, using traditional burners, microwaves, ultrasound, etc. Microwave and ultrasonic fining may provide a cost advantage over traditional fining processes but can suffer from poor penetration depths and/or can be impractical to implement. Traditional burners using flame combustion to create hot spots can also have one or more disadvantages, such as the inability to precisely control the temperature of the hot spots. If the flame is not hot enough, a hot spot will not be generated and thus will not drive and/or enhance fining. If the flame is too hot, or if the center of the hotspot is too hot, volatilization of less stable oxides in the melt (e.g., boron) may occur, thus negatively impacting the composition of the final product.

Accordingly, it would be advantageous to provide glass fining processes which have higher throughput and/or lower cost, while also minimizing issues relating to glass quality, such as defects caused by bubbles in the melt. It would also be advantageous to provide glass fining processes and apparatuses suitable for melting specialty glass materials, such as glasses with higher glass transition temperatures.

SUMMARY

The disclosure relates, in various embodiments, to apparatuses for generating a thermal plasma, the apparatuses comprising an electrode, a grounded electrode, a dielectric plasma confinement vessel extending between the electrode and the grounded electrode, a magnetic field generator extending around the dielectric plasma confinement vessel, an inlet for delivering a gas into the dielectric plasma confinement vessel, an RF current source coupled to the electrode and the grounded electrode for converting the gas into a thermal plasma, and an outlet for delivering the thermal plasma. Systems for fining molten glass comprising such apparatuses are also disclosed herein. Further disclosed herein are glass structures, such as glass sheets, having a glass transition temperature ($T_g$) greater than about 1650° C. and a bubble concentration less than about 0.001 bubbles/pound. The glass structures can comprise at least about 45 wt %, for example from about 45 to about 95 wt %, of alumina and/or silica and less than about 55 wt %, for example from 5 to 55 wt %, of at least one oxide of barium, boron, magnesium, calcium, sodium, strontium, tin, and/or titanium.

Additional features and advantages will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present various embodiments, and are intended to provide an overview or framework for understanding the nature and character of the invention as it is claimed. The accompanying drawings are included to provide a further understanding, and are incorporated into and constitute a part of this specification. The drawings illustrate various embodiments and together with the description serve to explain the principles and operations of the invention.

BRIEF DESCRIPTION OF THE DRAWINGS

The following detailed description can be best understood when read in conjunction with the following drawings, where like structures are indicated with like reference numerals and in which.

DETAILED DESCRIPTION

Apparatuses

Disclosed herein are apparatuses for generating a thermal plasma, the apparatuses comprising an electrode, a grounded electrode, a dielectric plasma confinement vessel extending between the electrode and the grounded electrode, a magnetic field generator extending around the dielectric plasma confinement vessel, an inlet for delivering a gas into the dielectric plasma confinement vessel, an RF current source coupled to the electrode and the grounded electrode for converting the gas into a thermal plasma, and an outlet for delivering the thermal plasma.

As used herein, the terms "thermal plasma," "atmospheric thermal plasma," and variations thereof are intended to denote a gas such as a noble gas (e.g., argon) that passes through an incident high frequency electric field. Encountering the electromagnetic field produces ionization of the gas atoms and frees electrons which are accelerated to a high velocity and, thus, a high kinetic energy. Some of the high velocity electrons ionize other atoms by colliding with their outermost electrons and those freed electrons can in turn produce additional ionization, resulting in a cascading ionization effect. The plasma thus produced can flow in a stream and the energetic particles caught in this stream are projected toward and strike an object to be heated, thereby transferring their kinetic energy to the object (e.g., molten glass, etc.).

Figure 1:
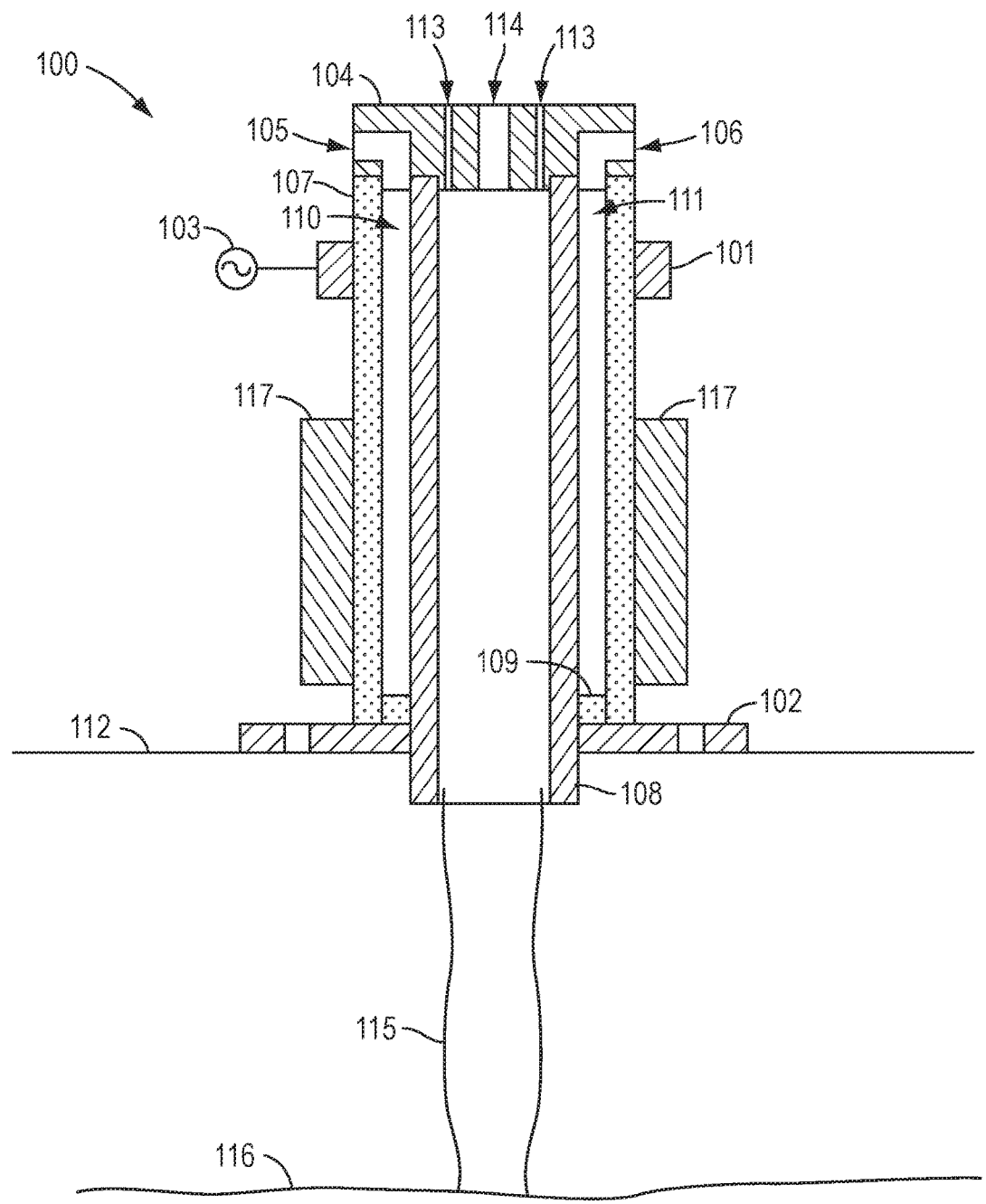
FIG. 1 is a cross-sectional view of an apparatus for fining glass batch materials according to one embodiment of the disclosure.

FIG. 1 illustrates a cross-sectional view of an exemplary apparatus 100 operable for carrying out a method according to embodiments of the present disclosure. In the illustrated embodiment, a thermal ring coupled plasma jet apparatus 100 is mounted on a wall of a fining tube 112. The apparatus comprises an electrode 101, a grounded electrode 102, and a dielectric plasma confinement vessel (or tube) 108 extending between the two electrodes. A magnetic field generator 117 extends around the confinement vessel 108 to induce a cyclonic flow of electrons around the magnetic field lines produced by the apparatus. Gas, e.g., noble gas, can be delivered to the plasma confinement vessel 108 via an inlet 104, and can exit the confinement vessel 108 as a plasma plume 115.

According to various embodiments, the electrode (or first electrode) 101 can be a ring comprising one or more metals or metal alloys. For instance, the electrode can comprise silver, copper, or other suitable metals with low resistivity such as aluminum, platinum, and gold, and combinations thereof. Materials with lower resistance can be advantageous, as higher resistance produces more heat and lowers the heat transfer (Q), which may lead to increased power loss. The thickness of the ring may also vary depending on various processing parameters. In some instances, it can be advantageous to employ a thicker ring, because the extra material can lower the overall resistivity and thus improve the efficiency of the RF current conduction. In one non-limiting embodiment, the electrode 101 is a silver-plated copper ring with a thickness ranging from about 1 cm to about 3 cm, such as about 2 cm. The electrode may be optionally cooled using water or any other suitable fluid, depending on the applied power and/or proximity of the electrode to the fining vessel.

The grounded electrode (or second electrode) 102 can also be a ring comprising one or more metals or metal alloys as disclosed above, for example, platinum, and may have a thickness as set forth above, e.g., from about 1 cm to about 3 cm, or about 2 cm. In certain embodiments, the grounded electrode 102 can comprise a mounting flange through which the plasma plume can exit. The grounded electrode may be optionally cooled using water or any other suitable fluid, depending on the applied power and/or proximity of the electrode to the fining vessel. As opposed to arc plasma jets, which employ internal arc electrodes, the apparatuses disclosed herein can employ external electrodes that are not in physical contact with the plasma plume. Such a configuration may avoid contamination of the glass melt due to vaporization of electrode material.

The RF field can be set up between the two electrodes 101 and 102 using an RF current source 103, which can generally comprise an RF generator (not shown) and RF matchwork (not shown). In some embodiments, the RF current can have a frequency ranging from about 3 MHz to about 100 MHz, such as from about 5 MHz to about 90 MHz, from about 10 MHz to about 80 MHz, from about 20 MHz to about 70 MHz, from about 30 MHz to about 60 MHz, or from about 40 MHz to about 50 MHz, including all ranges and subranges therebetween. For instance, exemplary RF frequencies include 6.78 MHz, 13.56 MHz, 27.12 MHz, and 40.68 MHz. The RF current source 103 can operate at a power ranging from about 10 kW to about 100 kW, depending on the volume of the glass melt to be fined, for example, the power can range from about 20 kW to about 90 kW, from about 30 kW to about 80 kW, from about 40 kW to about 70 kW, or from about 50 kW to about 60 kW, including all ranges and subranges therebetween.

A gas can be introduced into the plasma confinement tube 108 via the inlet 104. The inlet 104 can comprise a flange constructed from metals (e.g., brass), metal alloys (e.g., stainless steel), or ceramic materials. The inlet can comprise a central jet 114 through which the gas flows, and an outer annulus of jets 113. The outer annulus of jets can comprise any number of smaller jets, for instance, up to 16 jets or more, as desired for a particular application. The downward flow from the annulus of jets 113 may serve to direct the working gas flow towards the center of the plasma confinement tube 108. According to various embodiments, the gas can be chosen from noble gases, such as helium, neon, argon, krypton, and xenon. The gas flow rate from both the central jet 114 and the annulus of jets 113 can range, for example, from about 1 slpm to about 30 slpm, such as from about 2 slpm to about 28 slpm, from about 5 slpm to about 24 slpm, from about 8 slpm to about 20 slpm, or from about 10 slpm to about 15 slpm, including all ranges and subranges therebetween. In some embodiments, the gas flow rate from the central jet may range from about 1 to about 24 slpm, and the gas flow rate from the annulus of jets may independently range from about 1 to about 24 slpm.

The flange can be cooled using water or any other suitable fluid. A cooling inlet 105 and cooling outlet 106 can be provided and can be connected to a chiller (not shown) to maintain the water or other coolant at a desired temperature, e.g., room temperature. In some instances, it may be advantageous to keep the plasma containment vessel 108 at or above about room temperature, as cooler temperatures may produce condensation on the exterior of the apparatus, which may be undesirable in a glass production environment. The plasma containment vessel 108 may have any shape or dimension and, in certain instances, may be tubular in shape.

A cooling containment vessel (or cooling jacket) 107 may be provided around the plasma confinement vessel 108, for containing the cooling water or other cooling fluid. Both the containment vessel 107 and the confinement vessel 108 can be constructed from dielectric materials, such as high-temperature ceramic materials, e.g., silicon nitride, high purity alumina, and combinations thereof. The containment vessel 107 can provide spaces 110 and 111 for the circulating coolant to flow around the confinement vessel 108 to cool it evenly. A ring seal 109 can be provided to seal the cooling jacket and keep the spaces 110 and 111 substantially watertight. The ring seal 109 can also be constructed from ceramic materials and can, in some embodiments, be sealed between the two vessels using, e.g., a thermal epoxy. Optionally, the spaces 110 and 111 may further comprise ceramic rods (not shown) for deflecting water flow evenly around the entire confinement vessel 108. These rods may improve water circulation and ensure proper cooling of both the lower and upper portions of the plasma confinement vessel.

The magnetic field generator 117 can be placed around the plasma confinement vessel 108 (and the cooling jacket 107), for instance, concentric with the confinement vessel(s) and can be used to provide a desired plasma flow pattern. For example, the magnet may pinch the plasma inward by causing the ions and electrons to spiral around the magnetic field lines, thus producing a cyclonic flow. Lorentz force due to the presence of both electric and magnetic fields in the plasma confinement vessel 108 can produce an electron cyclotron resonance (ECR) effect, depending on the strength of the magnetic field. ECR may also depend on the electron collision rate, which may in turn depend on other factors such as pressure. The electron collision rate may, for example, be higher at atmospheric pressure due to limited free space (e.g., mean free space on the order of about 68 nm), such that the electrons have limited time to spiral around the magnetic field lines before colliding with other particles. The degree to which the electrons do spiral causes them to pick up additional kinetic energy which they can then transfer to the particle with which they collide, the particle inelastically absorbing the kinetic energy and then becoming captured by the magnetic field lines with an initially higher energy, subsequently rotating a few times, and then colliding with another particle. In lower pressure plasmas, the mean free space may be larger (e.g., on the order of several cm), such that the electrons may spiral for longer distances without being impeded.

When cyclotron resonance occurs, the electrons may have additional opportunities to collide with ions and neutrals, thereby transferring their kinetic energy (gained from accelerating around the magnetic field lines). The ions and neutrals can absorb this kinetic energy, which is then transformed into heat, causing the ions and neutrals to vibrate more intensely. A neutral may furthermore become ionized due to collision with an electron, which ejects a valence electron out of its orbital and increases the number of free electrons due to the Townsend Effect. The ECR effect can thus serve to dramatically raise the temperature of the plasma to levels sufficient for creating hot spots in the plasma melt.

The magnetic field required to produce ECR depends, for example, on the frequency of the RF current. The required magnetic field strength (B) can be calculated (for non-relativistic speeds) using the following formula:

$$B = \frac{\omega \cdot m}{e}$$

wherein $\omega$ is the angular frequency ($2\pi \cdot$frequency), m is the rest mass of an electron ($9.11 \times 10^{-31}$ kg), and e is the elementary charge of the electron ($1.602 \times 10^{-19}$ C). Thus, to produce ECR at an exemplary frequency of 13.56 MHz, the minimum required magnetic field strength (B) can be calculated as follows:

$$\frac{2\pi(13.56 \times 10^{6})(9.11 \times 10^{-31} \text{ kg})}{1.602 \times 10^{-19} \text{ C}} = 0.00048 \frac{\text{kg}}{C \cdot s}$$

or $T$, Tesla

The surrounding magnetic field generator 117 for an apparatus operating at a frequency of 13.56 MHz should therefore have a field strength of at least about $4.8 \times 10^{-4}$ T. Of course, it is within the ability of one skilled in the art to calculate the magnetic field strength for other operating frequencies and to choose or modify the magnet accordingly.

According to various embodiments, a solenoid can be used to produce the magnetic field. The field strength can be controlled in the solenoid, for example, by varying the DC current. In certain embodiments, the solenoid can be cooled with water or any other suitable fluid to maximize efficiency. Of course, other magnetic field generators can be used and are envisioned to fall within the scope of the disclosure.

The apparatus 100 can, in various embodiments, be mounted on the wall of a fining tube 112. The plasma plume 115 can thus exit the plasma confinement tube 108 and strike the surface of the glass melt 116 within the fining tube. The plasma plume 115 may be envisioned as having a substantially cylindrical or slightly conical shape, with a given length and a circular cross-section. The circular cross-section is defined by the center, or core, and various concentric rings or sheaths. The temperature of the plasma plume may thus be described as a cross-sectional gradient, where the core of the plasma plume can have a temperature of up to about 11,000K and the outer sheath or outer edge of the plasma plume stream may have a relatively lower temperature of at least about 300K. For instance, the core may have a temperature ranging from about 9,000K to about 11,000K and the outer sheath may have a temperature ranging from about 300K to about 1,000K, such as from about 300K to about 500K. Multiple apparatuses 100 can be mounted at various positions along the fining tube to create hot spots in the glass melt as it flows through the fining tube. According to various embodiments, the apparatus can operate at temperatures sufficient to produce hot spots with a local temperature that can reach as high as 2000° C. For example, the apparatus can heat the glass melt to temperatures ranging from about 500° C. to about 1900° C., such as from about 800° C. to about 1800° C., from about 1000° C. to about 1700° C., from about 1200° C. to about 1600° C., or from about 1400° C. to about 1500° C., including all ranges and subranges therebetween.

Figure 2:
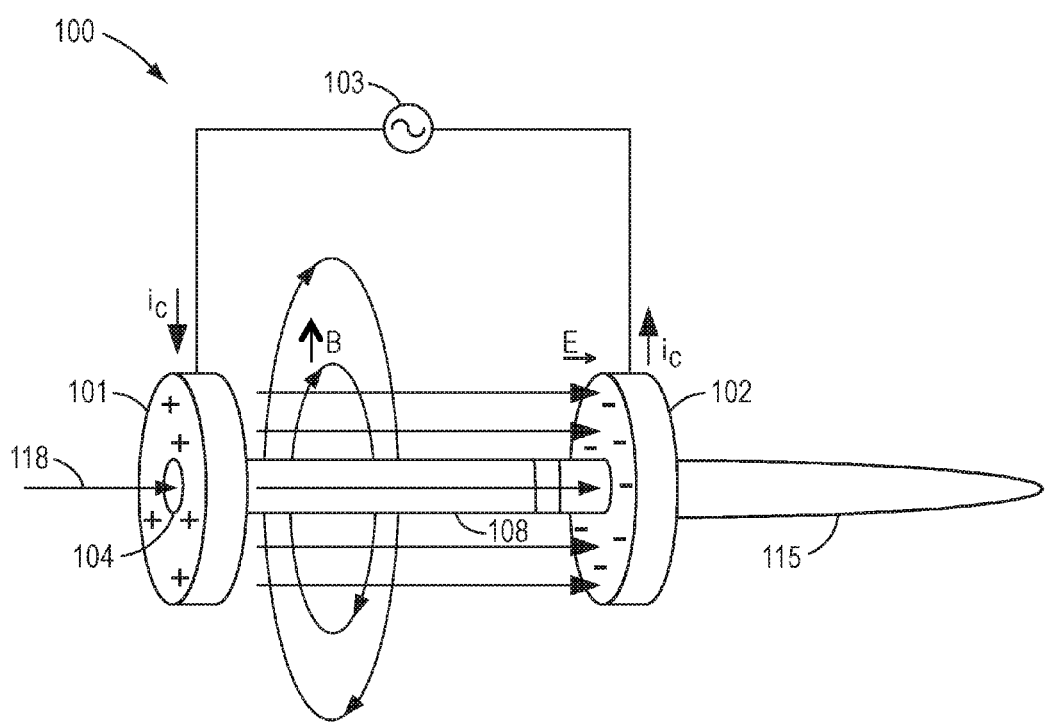
FIG. 2 depicts an apparatus for fining glass batch materials according to various embodiments of the disclosure.

FIG. 2 provides another illustration of an apparatus 100 for carrying out various methods disclosed herein. As in FIG. 1, the apparatus comprises an electrode 101, a grounded electrode 102, and a dielectric plasma confinement vessel 108 between the two electrodes. Gas 118 enters the confinement vessel 108 by way of the inlet 104 and exits as a plasma plume 115. The two electrodes are connected to an RF source 103 that provides a current $i_c$ between the electrodes. In the first half of a sinusoidal cycle, the electrode 101 is positively charged and the grounded electrode 102 is negatively charged. During operation the grounded electrode 102 stays at ground potential, but the electrode 101 can swing from positive above ground to negative with respect to ground. Magnetic field lines B are illustrated as orthogonal to the direction of gas flow and the plasma plume. Electric field lines E run from positive to negative charges and can apply force to the outermost electrons in that direction. A second magnetic field is generated by the magnetic field generator (not shown) with field lines running parallel to the direction of gas flow. The magnetic fields can pull the electrons into a circular motion, forming a helical path in the gas that can change direction with the sinusoidal direction change of the RF field.

The apparatus disclosed herein can, in some embodiments, be envisioned as functioning in a manner similar to a dielectric barrier discharge plasma jet, although such apparatuses lack the form and function necessary to produce a thermal plasma as disclosed herein. For example, dielectric barrier discharge devices use much lower frequencies (e.g., less than 500 kHz) and thus produce a non-thermal plasma with a very small plasma volume. Ionization levels are very weak due to low electron density and low temperature. Accordingly, the plasma produced by such plumes is not sufficient in volume or temperature for heating a glass melt to high fining temperatures, particularly in view of the potentially large surface area of the glass melt. In contrast, the apparatuses disclosed herein function at much higher frequencies (e.g., 3 MHz or greater), high power (e.g., 10 kW or greater), and high circulating currents in the plasma (e.g., up to 14 Amps). Moreover, the use of a magnetic field generator to induce ECR raises the temperature of the plasma plume to a level sufficient for driving and/or enhancing glass fining.

As such, apparatuses for generating thermal plasma disclosed herein can be useful in glass fining processes, e.g., for heating the molten glass to higher temperature through electron bombardment instead of flame combustion. This and other features allows for an apparatus that is flexible, tunable, and less expensive than conventional fining apparatuses. In particular, apparatuses for generating a thermal plasma as disclosed herein can, in some embodiments, be precisely controlled and tuned to a desired temperature, thereby avoiding hot spots that are too cool or too hot and the respective disadvantages associated therewith.

Methods

Disclosed herein are methods for fining molten glass, the methods comprising generating a thermal plasma using an apparatus as described herein, introducing molten glass into a fining vessel, and contacting the molten glass with the thermal plasma. According to various embodiments disclosed herein, molten glass batch materials are contacted with and heated by a plasma plume. As used herein, the terms "contact" and "contacted" and variations thereof are intended to denote the physical and/or thermal interaction of the molten glass with the plasma. For instance, the glass may be physically contacted by the plasma and/or the glass may come into thermal contact with the plasma, e.g., the heat produced by the thermal plasma. The molten glass can be directly heated by the plasma or indirectly heated by contact with a material or surface that is heated by the plasma.

Figure 3A:
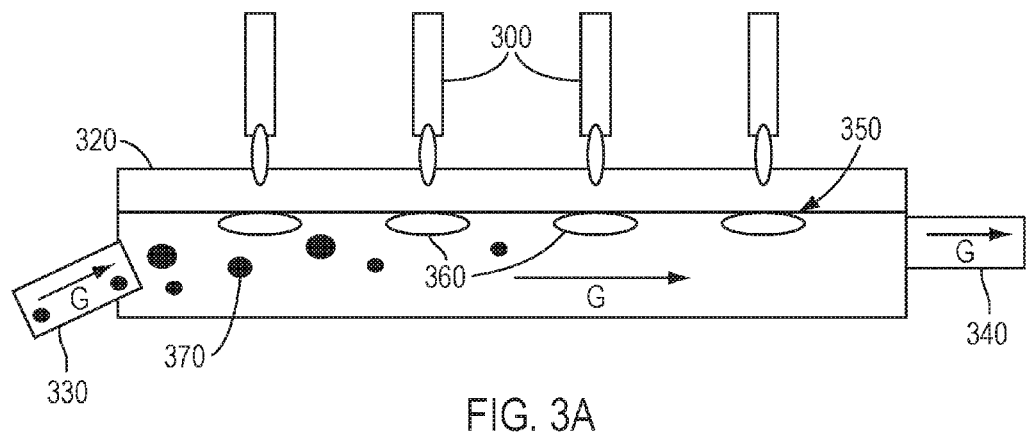
FIGS. 3A-B are cross-sectional views of systems for fining glass batch materials according to various embodiments of the disclosure.
Figure 3B:
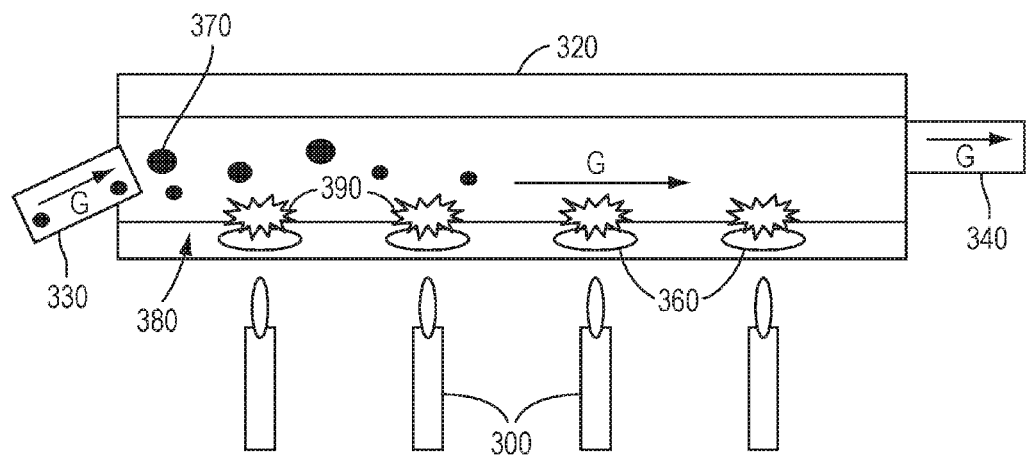

It is also to be understood that heating of the molten glass by contact with the thermal plasma may be an overall heating of the molten glass or a localized heating of selected regions of the glass melt (e.g., creation of "hot spots"). Localized heating, as opposed to overall heating, provides heat to one or more predetermined regions, e.g., in the fining vessel, such that the glass travels through discrete zones that are relatively hot and cold with respect to one another, these zones optionally alternating along the length of the finer. FIGS. 3A-B depict alternate system configurations for carrying out the methods according to various embodiments disclosed herein. Both FIGS. 3A-B depict configurations for localized heating and will be discussed in more detail below.

In FIG. 3A, a plurality of plasma torches 300 can be attached or otherwise coupled to a fining vessel 320 and/or can be placed in proximity to the vessel. For instance, the plasma torches 300 can be positioned just outside the fining vessel, such as within the walls of the refractory sections of the finer. Glass melt G flows from the inlet 330 to the outlet 340, as indicated by the arrows. In the illustrated embodiment, the plasma torches 300 can be pointed at the glass-air interface 350, creating one or more localized hot spots 360 at the surface which can radiate into the glass melt G and locally increase the temperature of the glass. The increased temperature can promote Stokes fining and activate chemical fining in the glass melt, such that bubbles 370 in the glass melt can rise to the surface and/or collapse. Additionally, the plasma plume(s) may introduce convection currents in the glass melt that may disrupt laminar flow of the glass melt and promote mixing in the fining vessel, which can further promote fining and/or reduce the need for mixing downstream. According to various embodiments, the system configuration depicted in FIG. 3A, which provides hot spots at the glass-air interface, can be advantageous for shallow fining set ups.

FIG. 3B depicts an alternate configuration, in which the plasma torches 300 are positioned below the fining vessel 320. In the illustrated embodiment, one or more localized hot spots 360 are created below the glass, which may promote Stokes fining as the hot glass rises from the bottom of the finer. The plasma torches are pointed at and impinge on a surface 380 in contact with the glass. The glass melt G is then heated via heat transfer 390 from the surface 380. According to certain embodiments, the system configuration depicted in FIG. 3B may provide enhanced fining (e.g., Stokes fining) as compared to the configuration of FIG. 3A, but this configuration may be less efficient if the material (surface 380) upon which the torch impinges does not efficiently transfer heat to the glass melt. Moreover, in this configuration the material that is in contact with the plasma should be selected to withstand heat from the plasma torch without being damaged.

The methods disclosed herein may have various advantages over prior art fining methods. For instance, by using thermal plasma to heat the molten glass, it may be possible to reduce the footprint of the fining equipment (e.g., shorten the length of the fining vessel). The ability to reduce the amount of precious materials (e.g., Pt) used to construct such fining vessels even by a small fraction can translate into significant capital savings. Alternatively, for pre-existing fining systems and vessels, it may be possible to increase the throughput of molten glass thereby improving efficiency and generating increased revenue. Moreover, the use of targeted, tunable plasma to heat the molten glass may result in reduced wear over the lifetime of the equipment. For example, even a 2% reduction in the amount of platinum oxidation over the period of a year can result in significant cost savings.

Additionally, the methods disclosed herein may be advantageously combined with other glass melting techniques, such as submerged combustion melting (SCM). SCM is a high throughput melting technology with a small footprint and relatively low cost that melts glass by injecting gas-oxy flames directly into the glass melt. SCM has a favorably high melting rate, but has the disadvantage of generating a foamy, wet glass (e.g., up to about 30% void fraction). The use of thermal plasma to fine such a glass melt may be advantageous because it can effectively break up foam in the melt and can generate higher temperatures compatible with the melting temperatures employed for SCM, which may be needed to promote chemical fining. Additionally, fining with thermal plasma is a relatively dry process and, thus, can be used to remove water from the SCM glass melt, which can be advantageous particularly in the case of glass that is to be chemically strengthened by ion exchange in downstream processing steps. Furthermore, the SCM melting equipment may comprise an intermediate chamber connecting the SCM to the fining vessel and this chamber may be easily retrofitted to include a plasma fining apparatus.

Glass Structures

The term "glass batch materials" and variations thereof is used herein to denote a mixture of glass precursor particles which, upon melting, react and/or combine to form a glass. The glass batch materials may be prepared and/or mixed by any known method for combining the glass precursor particles. For example, in certain non-limiting embodiments, the glass batch materials may comprise a dry or substantially dry mixture of glass precursor particles, e.g., without any solvent or liquid. In other embodiments, the glass batch materials may be in the form of a slurry, for example, a mixture of glass precursor particles in the presence of a liquid or solvent.

According to various embodiments, the glass batch materials may comprise glass precursor materials, such as silica, alumina, and various additional oxides, such as barium, boron, magnesium, calcium, sodium, strontium, tin, or titanium oxides. For instance, the glass batch materials may be a mixture of silica and/or alumina with one or more additional oxides. In various embodiments, the glass batch materials comprise from about 45 to about 95 wt % collectively of alumina and/or silica and from about 5 to about 55 wt % collectively of at least one oxide of barium, boron, magnesium, calcium, sodium, strontium, tin, and/or titanium.

Various specialty or "unconventional" glass compositions may present challenges due to extremely high melting points, particularly in view of the tendency to operate the finer at temperatures significantly higher than the melter. For example, glass batch materials comprising a mixture of barium oxide and alumina or a mixture of calcium oxide and alumina may have extremely high melting temperatures, e.g., above 2100° C., which complicates the melting process and makes conventional fining difficult, if not impossible. Ultra-low expansion (ULE®) glasses comprising high levels of silica and low levels of titanium dioxide may also present difficulties when melted and fined using traditional processes.

Specialty glasses may also be produced from batch materials comprising relatively high amounts of alumina, e.g., greater than about 20 wt % of alumina. Specialty glass compositions that may be fined using the methods and apparatuses disclosed herein may include mixtures of alumina and barium oxide, such as mixtures comprising at least about 50 wt % alumina and less than about 50 wt % barium oxide, for example, a mixture comprising from about 50 to about 75 wt % alumina and from about 25 to about 50 wt % barium oxide, or a mixture of about 67 wt % alumina and about 33 wt % barium oxide. Similar mixtures comprising alumina and calcium oxide may also be used as glass batch materials, for instance, a mixture comprising from about 70 to about 80 wt % alumina and from about 20 to about 30 wt % calcium oxide.

ULE® glasses may comprise high levels of silica, for instance from about 85 to about 95 wt % silica, and from about 5 to about 15 wt % titanium oxide, or greater than about 90 wt % silica and less than about 10 wt % titanium oxide. These ULE® glasses may include hydroxyl groups (—OH) and various additional elements, such as Nb, Ta, F, and Al. For instance, the ULE® glasses may include less than about 5 wt % of such additional elements. In certain embodiments, the ULE® glass may include such elements in an amount ranging from about 0.1 to about 5 wt %, such as from about 0.5 to about 3 wt %, or from about 1 to about 2 wt %.

In certain non-limiting embodiments, the batch materials comprise less than about 55 wt % of at least one oxide of barium, boron, magnesium, calcium, sodium, strontium, tin, and/or titanium, for example, less than about 50 wt %, less than about 45 wt %, less than about 40 wt %, less than about 35 wt %, less than about 30 wt %, less than about 35 wt %, less than about 20 wt %, less than about 15 wt %, less than about 10 wt %, or less than about 5 wt %, relative to the total weight of the glass batch materials, including all ranges and sub-ranges therebetween. Without wishing to be bound by theory, it is believed that glasses low in such modifiers may have higher glass transition temperatures and may thus be more difficult to melt and/or fine using conventional methods.

By way of non-limiting example, the glass batch materials may comprise less than about 55, 50, 45, 40, 35, 30, 25, 20, 15, 10, or 5 wt % of barium oxide, including all ranges and sub-ranges therebetween. The glass batch materials may likewise comprise less than about 55, 50, 45, 40, 35, 30, 25, 20, 15, 10, or 5 wt % of boron oxide, including all ranges and sub-ranges therebetween. Alternatively, the glass batch materials may comprise less than about 55, 50, 45, 40, 35, 30, 25, 20, 15, 10, or 5 wt % of magnesium oxide, including all ranges and sub-ranges therebetween. In other embodiments, the glass batch materials may comprise less than about 55, 50, 45, 40, 35, 30, 25, 20, 15, 10, or 5 wt % of calcium oxide, including all ranges and sub-ranges therebetween. According to further embodiments, the glass batch materials may comprise less than about 55, 50, 45, 40, 35, 30, 25, 20, 15, 10, or 5 wt % of sodium oxide, including all ranges and sub-ranged therebetween. In yet further embodiments, the glass batch materials may comprise less than about 55, 50, 45, 40, 35, 30, 25, 20, 15, 10, or 5 wt % of strontium oxide, including all ranges and sub-ranges therebetween. In still further embodiments, the glass batch materials may comprise less than about 55, 50, 45, 40, 35, 30, 25, 20, 15, 10, or 5 wt % of tin oxide, including all ranges and sub-ranges therebetween. According to other embodiments, the glass batch materials may comprise less than about 55, 50, 45, 40, 35, 30, 25, 20, 15, 10, or 5 wt % of titanium oxide, including all ranges and sub-ranges therebetween. It is to be understood that various mixtures of oxides described above may be used, with the total amount of the at least one oxide being less than about 55 wt %. By way of non-limiting example, a mixture of sodium and calcium oxides may be used, or a combination of titanium and sodium oxides may be used, or a combination of magnesium, sodium, and calcium oxides may be used, and so forth.

The silica and/or alumina may be present in a combined amount of at least about 45 wt % of the glass batch materials, for instance, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, or at least about 95 wt %. According to certain embodiments, the glass batch materials may comprise at least about 45, 50, 55, 60, 65, 70, 75, 80, 85, 90, or 95 wt % of silica. In other embodiments, the glass batch materials may comprise at least about 45, 50, 55, 60, 65, 70, 75, 80, 85, 90, or 95 wt % of alumina. It is to be understood that mixtures of silica and alumina in the amounts indicated above may also be used, with the combined amount of silica and alumina being greater than about 45 wt %.

It is also envisioned that additional glass batch compositions which may require elevated melting temperatures and/or which may have other processing difficulties similar to those described above can be used as the glass batch materials processed in the methods described herein. For instance, glass batch compositions comprising silicon nitride, silicon carbide, zirconia, and other oxides with high melting temperature may be suitable for processing according to the methods described herein. High performance optical glasses, such as EAGLE XG® and Lotus™ XP from Corning Incorporated, may also be processed according to the methods described herein.

The glass batch materials may be prepared by any method known in the art for mixing and/or processing glass batch materials. For instance, the batch materials may be mixed, milled, ground, and/or otherwise processed to produce a desired mixture with a desired size and/or shape. For example, the glass batch materials may have an average particle size of less than about 1,000 microns, for instance, less than about 900, 800, 700, 600, 500, 400, 300, 200, or 100 microns, and all ranges and sub-ranges therebetween. In various embodiments, the glass batch materials can have an average particle size ranging from about 5 microns to about 1,000 microns, such as from about 50 microns to about 900 microns, from about 100 microns to about 800 microns, from about 150 microns to about 700 microns, from about 200 microns to about 600 microns, or from about 250 microns to 500 microns, and all ranges and sub-ranges therebetween. In further embodiments, the average particle size of the glass batch materials may be less than about 100 microns, such as less than about 50 microns, less than about 25 microns, or less than about 10 microns.

The methods and apparatuses described herein provide a means to melt and fine glass batch materials which can then be used to form glass structures. As used herein the term "glass structure" and variations thereof is intended to denote a glass article made by processing molten glass, for instance, any article produced after the fining process. The glass structure is not limited in shape, dimension, composition, or microstructure, and can be any conventional or unconventional article. The glass structure can be, for example, an article that has been cooled, e.g., to room temperature, or can be an article that exists in a molten or semi-molten state. In some embodiments, the glass structure may be a glass sheet, such as that produced by fusion-draw, slot-draw, or float processes. A wide variety of other glass shapes with varying compositional and physical properties are envisioned and intended to fall within the scope of the disclosure.

According to various embodiments, the methods disclosed herein can make it possible to fine unconventional glass compositions having relatively higher glass transition temperatures ($T_g$), such as greater than about 1650° C., greater than about 1700° C., greater than about 1800° C., greater than about 1900° C., or greater than about 2000° C., including all ranges and subranges therebetween. In other embodiments, it may be possible to fine conventional (and unconventional) glass compositions more effectively than prior art methods, e.g., to produce molten glass and glass structures with less bubbles and/or blisters. For example, typical processes for fining molten glass may produce molten glass or glass structures with a bubble concentration ranging from about 0.001 to about 0.01 bubbles per pound of glass. In contrast, the methods disclosed herein can provide molten glass and glass structures having a bubble concentration at least about an order of magnitude lower, for example, less than about 0.001 bubbles per pound, less than about 0.0009, 0.0008, 0.0007, 0.0006, 0.0005, 0.0004, 0.0003, 0.0002, or 0.0001 bubbles/pound.

It will be appreciated that the various disclosed embodiments may involve particular features, elements or steps that are described in connection with that particular embodiment. It will further be appreciated that a particular feature, element or step, although described in relation to one particular embodiment, may be interchanged or combined with alternate embodiments in various non-illustrated combinations or permutations.

It is to be understood that, as used herein the terms "the," "a," or "an," mean "at least one," and should not be limited to "only one" unless explicitly indicated to the contrary. Thus, for example, reference to "a torch" includes examples having two or more such "torches" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Various ranges are expressed herein as "greater than about" one or more particular values or "less than about" one or more particular values and "all ranges and sub-ranges therebetween." When such ranges are expressed, examples include from any one particular value to any other particular value. For instance, glass batch materials comprising greater than about 45 wt % of alumina, such as greater than about 50, 55, 60, 65, 70, 75, 80, 85, or 90 wt % include ranges of alumina from about 45 wt % to about 90 wt %, from about 65 wt % to about 80 wt %, and all other possible ranges between each disclosed value. Similarly, glass batch materials comprising less than about 55 wt % of at least one oxide, such as less than about 50, 45, 40, 35, 30, 25, 20, 15, or 10 wt % include ranges of oxide from about 10 wt % to about 55 wt %, from about 15 wt % to about 40 wt %, and all other possible ranges between each disclosed value.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a temperature greater than 1000° C." and "a temperature greater than about 1000° C." both include embodiments of "a temperature greater than about 1000° C." as well as "a temperature greater than 1000° C."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus comprising A+B+C include embodiments where the apparatus consists of A+B+C, and embodiments where the apparatus consists essentially of A+B+C.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for fining molten glass comprising:
   introducing a gas into an apparatus for generating a thermal plasma by a radio frequency (RF) electromagnetic field, the apparatus comprising:
   an electrode,
   a grounded electrode,
   a dielectric plasma confinement vessel extending between the electrode and the grounded electrode,
   a magnetic field generator extending around the dielectric plasma confinement vessel,
   an inlet for delivering a gas into the dielectric plasma confinement vessel,
   an RF current source to create the RF electromagnetic field for converting the gas into a thermal plasma, and
   an outlet for delivering the thermal plasma,
   introducing molten glass into a fining vessel; and
   contacting the molten glass with the thermal plasma.

2. The method of claim 1, wherein the gas is a noble gas chosen from argon, helium, neon, krypton, and xenon.

3. The method of claim 1, wherein contacting the molten glass with the thermal plasma comprises directing the thermal plasma at a glass-air interface in the fining vessel.

4. The method of claim 1, wherein contacting the molten glass with the thermal plasma comprises directing the thermal plasma at an exterior surface of the fining vessel.

5. The method of claim 1, wherein the thermal plasma heats the molten glass to a temperature greater than or equal to about 1700° C.

6. The method of claim 1, wherein the thermal plasma locally heats at least one predetermined region in the fining vessel through which the molten glass flows.

* * * * *

UNITED STATES PATENT AND TRADEMARK OFFICE
CERTIFICATE OF CORRECTION

PATENT NO. : 10,167,220 B2
APPLICATION NO. : 15/425517
DATED : January 1, 2019
INVENTOR(S) : Daniel Robert Boughton et al.

Page 1 of 1

It is certified that error appears in the above-identified patent and that said Letters Patent is hereby corrected as shown below:

On the Title Page

On page 3, Column 2, item (56), other publications, Line 20, delete ""Acitvated" and insert -- "Activated --, therefor.

On page 4, Column 1, item (56), other publications, Line 27, delete "Capacitice" and insert -- Capacitive --, therefor.

On page 4, Column 2, item (56), other publications, Line 29, delete "Acaday" and insert -- Academy --, therefor.

Signed and Sealed this
Twentieth Day of August, 2019

Andrei Iancu
*Director of the United States Patent and Trademark Office*